United States Patent [19]

Kawamura

[11] Patent Number: 4,935,656
[45] Date of Patent: Jun. 19, 1990

[54] HIGH SPEED MOTOR/GENERATOR FOR TURBOCHARGER

[75] Inventor: Hideo Kawamura, Samukawa, Japan

[73] Assignee: Isuzu Motors Limited, Tokyo, Japan

[21] Appl. No.: 427,915

[22] Filed: Oct. 24, 1989

Related U.S. Application Data

[63] Continuation of Ser. No. 222,301, Jul. 22, 1988, abandoned, which is a continuation of Ser. No. 900,375, Aug. 26, 1986, abandoned.

[30] Foreign Application Priority Data

Aug. 29, 1985 [JP] Japan .................. 60-190095

[51] Int. Cl.⁵ .................. H02K 47/20; F02B 37/00
[52] U.S. Cl. .................. 310/156; 60/608; 310/113; 417/407
[58] Field of Search .................. 60/597, 607, 608; 310/102 R, 113, 156, 254, 262

[56] References Cited

U.S. PATENT DOCUMENTS

| | | | |
|---|---|---|---|
| 4,223,263 | 9/1980 | Hansen, Jr. et al. | 310/156 |
| 4,253,031 | 2/1981 | Frister | 417/407 |
| 4,445,061 | 4/1984 | Jackson, Jr. | 310/156 |
| 4,605,874 | 8/1986 | Whiteley | 310/156 |
| 4,625,135 | 11/1986 | Kasabian | 310/261 |
| 4,769,993 | 9/1988 | Kawamura | 310/156 |
| 4,827,170 | 5/1989 | Kawamura et al. | 60/608 |
| 4,850,820 | 7/1989 | Gutknecht | 417/407 |
| 4,878,347 | 11/1989 | Kawamura | 60/608 |

FOREIGN PATENT DOCUMENTS

| | | | |
|---|---|---|---|
| 0079100 | 5/1983 | European Pat. Off. | 60/608 |
| 822291 | 12/1937 | France | 310/156 |
| 58-6925 | 1/1983 | Japan . | |
| 101540 | 6/1984 | Japan | 310/113 |

Primary Examiner—Peter S. Wong
Assistant Examiner—D. L. Rebsch
Attorney, Agent, or Firm—Staas & Halsey

[57] ABSTRACT

A high-speed motor/generator drivable by a turbine includes a rotor mounted on the shaft of the turbine. Since the magnetic flux produced by the magnet of the rotor vary at a high frequency, a ferrite core of good high frequency characteristics is employed as a stator core confronting the rotor to reduce a high-frequency loss. To improve the flux density and magnetic permeability of the ferrite core (which one poorer than those of a core of silicon steel plates), the magnet of the rotor has a number of magnetic poles to increase the frequency at which the magnetic flux is varied, so that the electromotive force produced is increased.

12 Claims, 1 Drawing Sheet

HIGH SPEED MOTOR/GENERATOR FOR TURBOCHARGER

This is a continuation of copending application(s) Ser. No. 07/222,301, filed on 7/22/88 which is a continuation of 07/900,375 filed 8/26/86, both now abandoned.

CROSS REFERENCE TO RELATED APPLICATION

This application is related to U.S. application Ser. No. 901,150, filed Aug. 28, 1986, which is assigned to the assignee of the subject application.

BACKGROUND OF THE INVENTION

1. Field of the Invention

The present invention relates to a high-speed motor/generator drivable by a turbine, and more particularly to a high-speed motor/generator mounted on the shaft of a turbine which can be driven by the energy of an exhaust gas emitted from an internal combustion engine.

2 The Prior Art

Turbochargers incorporated in some internal combustion engines operate by driving a turbine utilizing the energy of an exhaust gas discharged by an internal combustion engine, and charging air into engine cylinders by a compressor coupled to the turbine for efficiently burning fuel in the engine cylinders. Japanese Laid-Open Utility Model Publication No. 58(1983)-6925 discloses a turbocharger system for an internal combustion engine, in which an ac machine is directly coupled to the rotatable shaft of a turbocharger. When an increased torque is produced by the engine or the engine is operated for a higher torque, the AC machine is operated as a motor, and when a reduced torque is produced by the engine or the engine is operated for a lower torque, the AC machine is operated as a generator to control the frequency of the current.

Generally used high-speed generators have a limit speed of a few tens of thousand revolutions per minute. If a double-pole rotary machine rotates at a speed of thirty thousand revolutions per minute, for example, the iron core of the rotary machine is placed in an alternating field having a frequency of 500 Hz. Even where the iron core is made up of silicon steel plates, any iron loss thereof is small, and substantially no problem arises.

However, when a machine rotates at a speed ranging from one hundred thousand revolutions per minute to two hundred thousand revolutions per minute, such as an exhaust gas turbine, the alternating field produced by a rotary machine directly coupled thereto has a frequency of 1000 Hz or higher. If the iron core of such a rotary machine is constructed of silicon steel plates, then its iron loss is greatly increased to produce a heat loss, resulting in a sharp reduction in the efficiency of the rotary machine.

SUMMARY OF THE INVENTION

It is an object of the present invention to provide a high-speed motor/generator which, when rotated at an ultrahigh speed by an exhaust gas turbine directly coupled thereto, can withstand such high-speed rotation and generate electric energy efficiently for effective recovery of exhaust gas energy.

According to the present invention, there is provided a high-speed motor/generator drivable by a turbine and having a rotor composed of a permanent magnet mounted on a shaft of the turbine and having at least three pairs of oppositely confronting magnetic poles, a stator core composed of a ferrite core disposed along an outer periphery of the rotor, and a stator winding disposed around the stator core.

The high-speed motor/generator is effective in converting an alternating field of a high frequency produced by the permanent magnet which rotates at a high speed into electric energy through the stator winding around the ferrite core serving as a magnetic core. Therefore, the high-speed motor/generator can function as an ac rotary machine which has a small loss even at a high frequency of the alternating field.

In order to eliminate a drawback due to the essential flux density of the ferrite core has, the permanent magnet of the rotor has a number of magnetic poles to increase the frequency of the alternating field, thereby producing an increased electromotive force. Consequently, the ac rotary machine has an improved efficiency.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
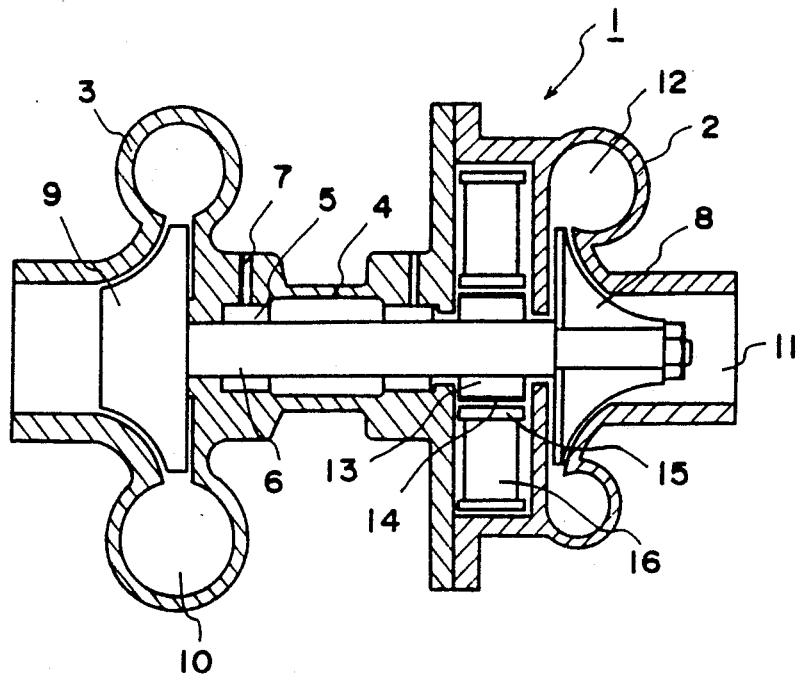
FIG. 1 is a longitudinal cross-sectional view of a high-speed motor/generator according to the present invention.

Referring to FIG. 1, a turbocharger, generally designated at 1, includes a compressor housing 2, a turbine housing 3, and a central housing 4. The central housing 4 supports bearings 5 in opposite ends thereof, and has lubricating oil passages 7 for supplying lubricating oil to the bearings 5.

A shaft 6 extends through the central housing 4 and is rotatably supported by the bearings 5. A compressor impeller 8 and a turbine impeller 9 are mounted respectively on the opposite ends of the shaft 6. The turbine impeller 9 is disposed in the turbine housing 3 and can be rotated by the energy of exhaust gas discharged from an internal combustion engine (not shown) and applied thereto through a scroll 10 in the turbine housing 3. As the turbine impeller 9 is thus rotated, it enables the shaft 6 to rotate the compressor impeller 8. The compressor impeller 8 is disposed in the compressor housing 2. When the compressor impeller 8 is rotated, it draws air from an air inlet 11. The introduced air is pressure-converted by a diffuser 12, and charged under pressure into the cylinders of the internal combustion engine.

Figure 2:
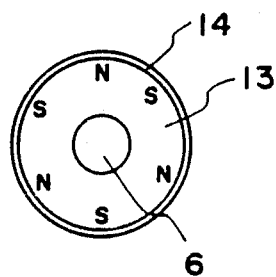
FIG. 2 is a transverse cross-sectional view of a rotor of the high-speed motor/generator shown in FIG. 1.

An annular rotor 13 is disposed around the shaft 6 axially between the compressor impeller 8 and the turbine impeller 9. The rotor 13 comprises a permanent magnet containing a rare earth element. As illustrated in FIG. 2, the permanent magnet of the rotor 13 has three diametrical pairs of N and S magnetic poles each pair of the magnetic poles being disposed side by side, so that a magnetic field is generated at the outer periphery of the rotor 13 with strong magnetic lines of force extending in a radial direction with respect to the shaft 6 of the rotor 13. While only three pairs of magnetic poles are illustrated in FIG. 2, the rotor 13 may be magnetized such that more than three pole pairs may be formed.

The permanent-magnet rotor 13 is reinforced by a reinforcing pipe 14 force-fitted over the outer periphery thereof. The reinforcing pipe 14 is made of a thin material having high tensile strength, such as titanium alloy, partially stabilized zirconium, or stainless steel. Therefore, the rotor 13 is sufficiently durable and rugged for protection against damage which would otherwise occur due to centrifugal forces or vibration upon high-speed rotation thereof.

Around the rotor 13, there is disposed a stator core 15 in the form of a ferrite core having excellent magnetic properties as a high-frequency magnetic core. Changes in magnetic flux due to rotation of the permanent magnet of the rotor 13 are transmitted through the stator core 15 to the stator winding 16 which induces an electromotive force. The stator winding 16 comprises, for example, a three-phase AC winding disposed around the stator core 15 serving as the magnetic core. When the rotor/stator assembly operates as a generator, the induced electromotive force is picked up from the stator winding 16.

The electromotive force E of the generator can be expressed by:

$$E = \sqrt{2} \, (\pi f \phi)$$

where $\phi$ is the number of magnetic fluxes, f is the frequency.

The ferrite core has poorer flux density than a core of silicon steel plates. By multiplying the frequency f by the reciprocal of a ratio between the flux densities of the ferrite core and the silicon steel plate core to thereby increase the frequency of the alternating field, the electromotive force E as expressed above remains unchanged. Therefore, if the flux density of the ferrite core is ⅓ that of the silicon steel plate core, then the same electromotive force can be produced by using the frequency of the alternating field which is three times the frequency of the alternating field produced if the silicon steel plate core were employed. As a consequence, a generator capable of rotating at a high speed can be achieved.

In operation, the turbine impeller 9 is rotated at at high speed by the energy of the exhaust gas supplied through the scroll 10 to thereby enable the shaft 6 to rotate the rotor 13 and the compressor impeller 8. The compressor impeller 8 causes the diffuser 12 to pressure-convert air introduced from the air inlet 11 and delivers the air into the engine cylinders for increasing engine output.

The rotor 13 mounted on the shaft 6 is rotated at a high speed; i.e., the permanent magnet having at least three pairs of N and S magnetic poles is rotated. Therefore, strong magnetic lines of force extending radially of the shaft 6 are also rotated to rotate an alternating field at a high frequency in crossing relation to the stator winding 16 supported by the stator core 15 to enable the stator winding 16 to generate an electromotive force. Inasmuch as the magnetic core or the stator core 15 is constructed as a ferrite core having good high frequency characteristics, any loss which would otherwise be produced by the high-frequency alternating field is small, and the alternating field can efficiently be converted into electric energy.

The reinforcing pipe 14 fitted over the rotor 13 does not have any significant effect on the magnetic lines of force from the permanent magnet, and does not reduce the electromotive force induced by the stator winding 16.

The embodiment of the present invention has been described as operating as a generator. However, by supplying an electric current of a certain frequency to the stator winding 16, the rotor/stator assembly can be operated as a highly efficient motor to rotate the rotor 13 and hence the shaft 6 at a high speed. When engine torque is reduced, for example, the compressor impeller 8 can be rotated by the motor at a high speed to charge air into the engine cylinders to increase the engine torque.

As described above, the high-speed motor/generator according to the present invention converts an alternating field of a high frequency produced by the permanent magnet which rotates at a high speed, into electric energy through the stator winding around the ferrite core serving as a magnetic core. Therefore, the high-speed motor/generator can function as an AC rotary machine which is subject to a small loss even at a high frequency of the alternating field.

In order to eliminate a drawback due to the essential flux density which the ferrite core has, the permanent magnet of the rotor has a number of magnetic poles to increase the frequency of the alternating field, thereby producing an increased electromotive force. Consequently, the ac rotary machine has an improved efficiency. Furthermore, the rotor is reinforced by the reinforcing pipe force-fitted thereover, the pipe being made of a thin material having high tensile strength, such as titanium alloy, partially stabilized zirconium, or stainless steel. Therefore, the high-speed motor/generator is highly efficient and durable during high-frequency rotation.

Although a certain preferred embodiment has been shown and described, it should be understood that many changes and modifications may be made therein without departing from the scope of the appended claims.

What I claim is:

1. A high-speed motor/generator drivable by a turbine having a shaft, comprising:
    an annular rotor comprising a permanent magnet mounted on a shaft of the turbine and having at least three pairs of magnetic poles, each pair of the magnetic poles being disposed side by side and extending radially from the shaft;
    a stator core comprising a ferrite core disposed along an outer periphery of said rotor; and
    a stator winding disposed around said stator core.

2. A high-speed motor/generator according to claim 1, wherein said rotor further comprises a reinforcing pipe fitted over an outer periphery of said permanent magnet and made of a thin material.

3. A high-speed motor/generator according to claim 2, wherein said reinforcing pipe is selected from the group consisting of titanium alloy, partially stabilized zirconium or stainless steel.

4. A high-speed motor/generator according to claim 3, wherein said stator winding comprises a three-phase AC winding.

5. A high-speed motor/generator according to claim 1, wherein said stator winding comprises a three-phase AC winding.

6. A turbocharger for an engine, comprising:

a compressor impeller;

a turbine impeller;

a rotatable shaft coupled to said compressor impeller and said turbine impeller;

a cylindrical rotor comprising a permanent magnet mounted on said rotatable shaft, said rotor having three pairs of magnetic poles, each pair of the magnetic poles being disposed side by side and extending radially from said shaft;

a stator core comprising a ferrite core positioned about the periphery of said rotor; and a stator winding positioned about said stator core, said rotor, said stator core, and said stator winding forming a motor/generator.

7. A turbocharger according to claim 6, further comprising a reinforcing plate force-fitted over the outer periphery of said rotor.

8. A turbocharger according to claim 7, wherein said reinforcing plate is selected from the group consisting of a titanium alloy, partially stabilized zirconium, and stainless steel.

9. A turbocharger according to claim 7, wherein said rotor comprises a permanent magnet containing a rare earth element.

10. A turbocharger according to claim 9, wherein said stator winding comprises a three-phase AC winding.

11. A turbocharger according to claim 8, wherein said rotor comprises a permanent magnet containing a rare earth element.

12. A turbocharger according to claim 11, wherein said stator winding comprises a three-phase AC winding.

* * * * *

UNITED STATES PATENT AND TRADEMARK OFFICE
CERTIFICATE OF CORRECTION

PATENT NO. : 4,935,656
DATED : June 19, 1990
INVENTOR(S) : HIDEO KAWAMURA

It is certified that error appears in the above-identified patent and that said Letters Patent is hereby corrected as shown below:

ON TITLE PAGE: [56] References Cited - U.S. PATENT DOCUMENTS insert

--4,638,200   1/1987   Le Corre et al.   310/42--.

Column 1, line 22, after "2" insert a period --.--;

line 31, "ac" should be --AC--.

Column 2, line 11, "ac" should be --AC--;

line 18, "ac" should be --AC--.

Column 4, line 30, "ac" should be --AC--.

Column 6, line 11, Claim 11, line 1, "8" should be --6--.

Signed and Sealed this

Thirty-first Day of March, 1992

Attest:

HARRY F. MANBECK, JR.

*Attesting Officer*   *Commissioner of Patents and Trademarks*